US011067235B2

(12) United States Patent
Mellor et al.

(10) Patent No.: US 11,067,235 B2
(45) Date of Patent: Jul. 20, 2021

(54) LED DRIVER JUNCTION BOX WITH LEVELING MECHANISM

(71) Applicant: FINELITE INC., Union City, CA (US)

(72) Inventors: Jeffry Mellor, Union City, CA (US); David Daoud Aziz, Pleasanton, CA (US)

(73) Assignee: FINELITE INC., Union City, CA (US)

( * ) Notice: Subject to any disclaimer, the term of this patent is extended or adjusted under 35 U.S.C. 154(b) by 0 days.

(21) Appl. No.: 15/932,021

(22) Filed: Jan. 25, 2018

(65) Prior Publication Data

US 2018/0180233 A1 Jun. 28, 2018

Related U.S. Application Data

(63) Continuation-in-part of application No. 13/987,792, filed on Sep. 3, 2013, now abandoned.

(60) Provisional application No. 61/743,310, filed on Sep. 4, 2012, provisional application No. 62/603,619, filed on Jun. 6, 2017.

(51) Int. Cl.
| | |
|---|---|
| *F21S 8/00* | (2006.01) |
| *F21S 8/06* | (2006.01) |
| *F21V 23/00* | (2015.01) |
| *H02G 3/08* | (2006.01) |
| *F21V 21/03* | (2006.01) |
| *F21Y 115/10* | (2016.01) |
| *H02G 3/20* | (2006.01) |

(Continued)

(52) U.S. Cl.
CPC .............. *F21S 8/061* (2013.01); *F21V 21/03* (2013.01); *F21V 23/008* (2013.01); *H02G 3/08* (2013.01); *F21S 9/02* (2013.01); *F21Y 2115/10* (2016.08); *H02G 3/125* (2013.01); *H02G 3/20* (2013.01)

(58) Field of Classification Search
CPC ........ F21V 21/03; F21V 23/008; F21S 8/061; H02G 3/08
See application file for complete search history.

(56) References Cited

U.S. PATENT DOCUMENTS

| | | | | |
|---|---|---|---|---|
| 3,740,547 A | * | 6/1973 | Contratto | F21V 17/002 362/449 |
| 5,105,349 A | * | 4/1992 | Falls | F21V 21/38 248/329 |

(Continued)

FOREIGN PATENT DOCUMENTS

| | | | | |
|---|---|---|---|---|
| WO | WO 2017/204713 A | * | 11/2017 | F21S 8/06 |
| WO | WO-2017204713 A1 | * | 11/2017 | F21V 17/12 |

*Primary Examiner* — Gerald J Sufleta, II

(74) *Attorney, Agent, or Firm* — James A. Gavney, Jr.; JAG Patent Services

(57) ABSTRACT

A lighting system includes modular junction boxes and/or modular LED driver junction boxes with quick connect LED drivers. The modular junction boxes and/or modular LED driver junction boxes are attached to a ceiling mount to support or suspend an LED light fixture. The LED light fixture is suspended from the modular junction boxes and/or modular LED driver junction boxes through suspension cables that can includes a power suspension cable to power to the LED light fixture. The suspension cables are attached to the modular junction boxes and/or modular LED driver junction boxes through leveling gantry mechanisms for leveling the light fixture. In an embedment of the invention a lighting system includes a low-profile angled LED driver junction box.

19 Claims, 17 Drawing Sheets

(51) Int. Cl.
*H02G 3/12* (2006.01)
*F21S 9/02* (2006.01)

(56) References Cited

U.S. PATENT DOCUMENTS

| | | | | |
|---|---|---|---|---|
| 2004/0184264 | A1* | 9/2004 | Elam | F21S 9/022 |
| | | | | 362/148 |
| 2008/0170398 | A1* | 7/2008 | Kim | F21V 21/002 |
| | | | | 362/260 |
| 2008/0285291 | A1* | 11/2008 | Fornari | F21S 8/06 |
| | | | | 362/396 |
| 2009/0250573 | A1* | 10/2009 | Nuernberger | H02G 3/125 |
| | | | | 248/205.1 |
| 2010/0177511 | A1* | 7/2010 | Yu | F21V 23/008 |
| | | | | 362/217.05 |
| 2013/0279180 | A1* | 10/2013 | Pearson | F21V 15/015 |
| | | | | 362/371 |
| 2014/0036517 | A1* | 2/2014 | Machiorlette | F21V 27/00 |
| | | | | 362/387 |
| 2015/0176823 | A1* | 6/2015 | Leshniak | F21V 29/777 |
| | | | | 362/235 |
| 2015/0252988 | A1* | 9/2015 | Rashidi Doust | F21S 8/026 |
| | | | | 362/285 |
| 2016/0273743 | A1* | 9/2016 | Spitzer | F21V 21/03 |
| 2017/0314770 | A1* | 11/2017 | Pahl | F21S 8/026 |
| 2018/0274769 | A1* | 9/2018 | Vavruskova | F21V 14/00 |

\* cited by examiner

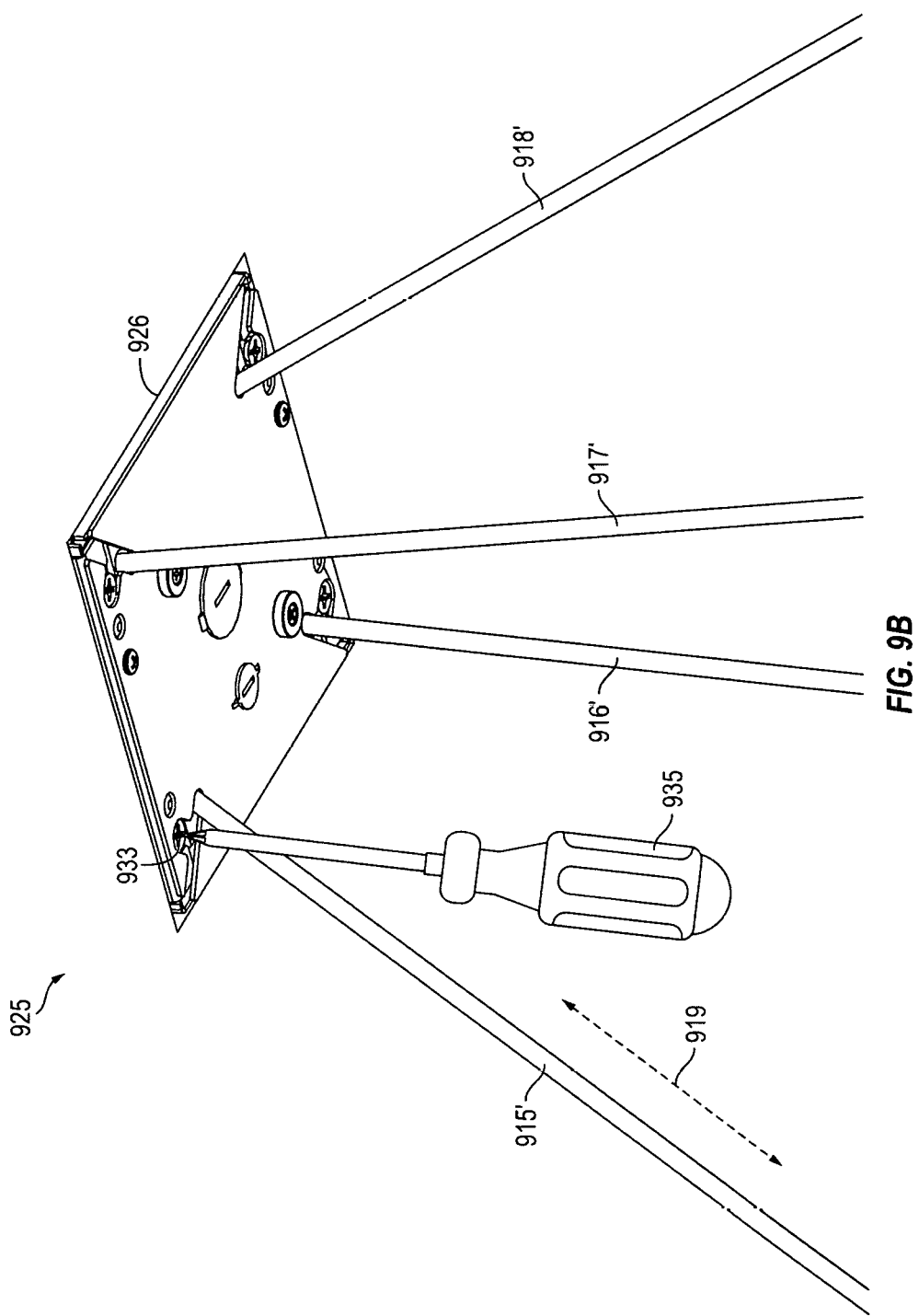

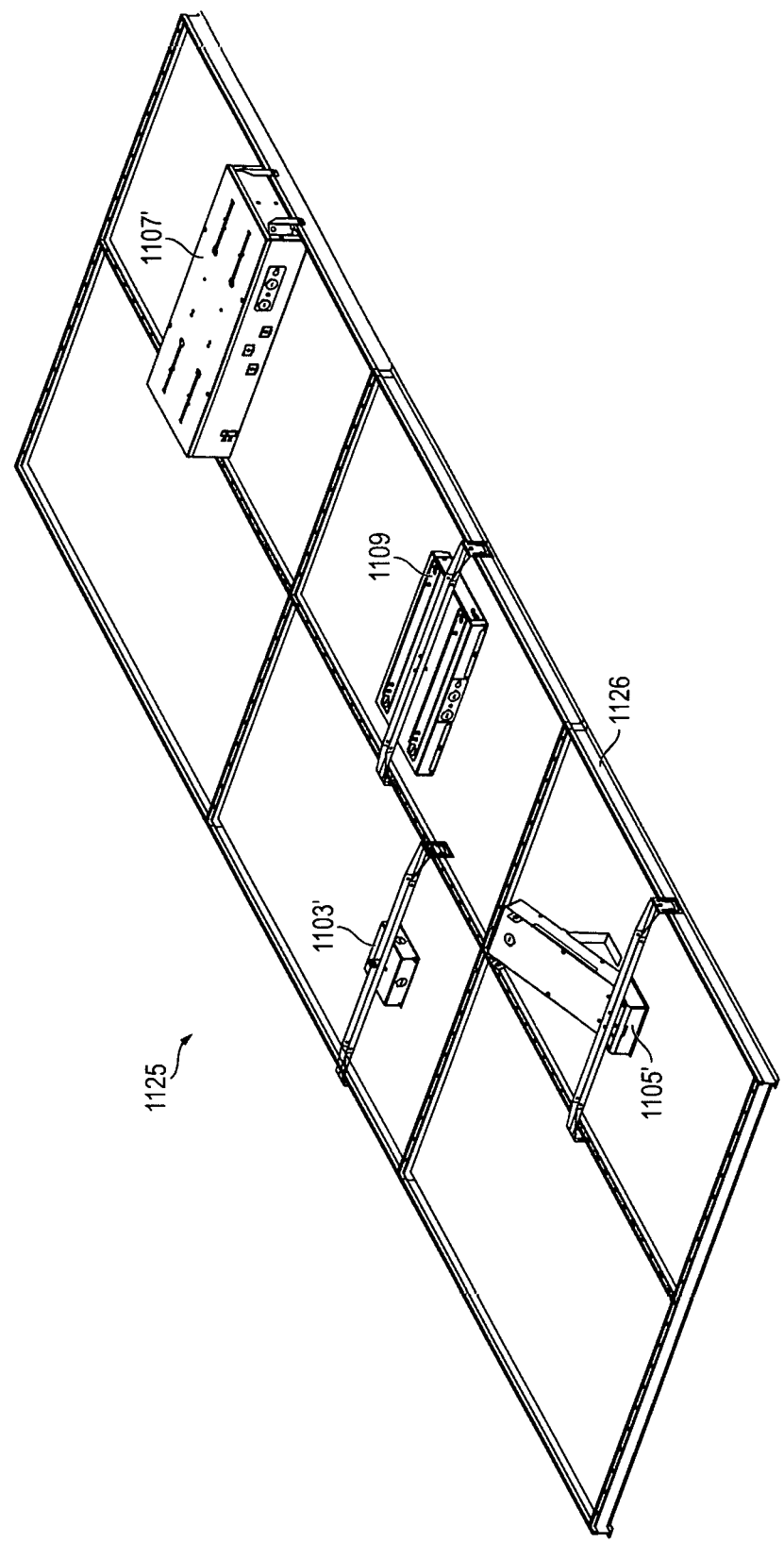

LED DRIVER JUNCTION BOX WITH LEVELING MECHANISM

RELATED APPLICATION

This application is a continuation-in-part of co-pending U.S. patent application Ser. No. 13/987,792, filed on Sep. 3, 2013, and titled "LED LIGHTING SYSTEMS", which claims priority under 35 U.S.C. § 119(e) from the U.S. provisional patent application Ser. No. 61/743,310, filed on Sep. 4, 2012, and titled "LED DRIVER JUNCTION BOX FOR LED LIGHT FIXTURES." This application also claims priority under 35 U.S.C. § 119(e) from the U.S. provisional patent application Ser. No. 62/603,619, filed on Jun. 6, 2017, and titled "LED DRIVER JUNCTION BOX WITH LEVELING MECHANISM." The co-pending U.S. patent application Ser. No. 13/987,792, filed on Sep. 3, 2013, and titled "LED LIGHTING SYSTEMS", the provisional patent application Ser. No. 61/743,310, filed on Sep. 4, 2012, and titled "LED DRIVER JUNCTION BOX FOR LED LIGHT FIXTURES" and the U.S. provisional patent application Ser. No. 62/603,619, filed on Jun. 6, 2017, and titled "LED DRIVER JUNCTION BOX WITH LEVELING MECHANISM" are all hereby incorporated by reference.

FIELD OF THE INVENTION

This invention relates to lighting systems. More specifically, this invention relates to Light Emitting Diode (LED) devices and systems.

BACKGROUND OF THE INVENTION

A light-emitting diode (LED) is a semiconductor diode that emits light when an electrical current is applied in the forward direction of the device, such as in a simple LED circuit.

The device is fabricated from layers of silicon and seeded with atoms of phosphorus, germanium, arsenic or other rare-earth elements. The layers of the device are called the die and the junction between the materials is where the light is generated. The electricity enters from one side of the die and exits out the other. As the current passes through the LED device, the materials that makes up the junction react and light is emitted.

LEDs are widely used as indicator lights on electronic devices and increasingly in higher power applications such as flashlights and area lighting. A LED is usually a small area (less than 1 $mm^2$) light source, often with optics added to the chip to shape its radiation pattern and assist in reflection. The color of the emitted light depends on the composition and condition of the semiconducting material used, and can be infrared, visible, or ultraviolet.

SUMMARY OF THE INVENTION

The present invention is directed to a LED lighting system. The system includes a recessed or a low-profile LED driver box. The LED driver box houses one or more LED drivers or driver circuits that power one or more LED light fixtures. In accordance with the embodiments of the invention, the LED drivers are vertically stacked LED or horizontally stacked LED driver within the LED driver box. The LED drivers individually or collectively provides 40 watts of power or more. The LED driver box includes one or more service plates or service doors to access and/or service the LED drivers and any electrical connections therein.

Preferably, the LED drivers are coupled to a load circuit and one or more light fixture through quick-lock or snap connectors, such that the LED drivers can be readily replaced without rewiring. In further embodiments of the invention, a battery provides back-up power to an LED light fixture couple to the LED driver box in the event of a power failure.

The system of the present invention also includes a mechanism to attach and secure the driver box to one or more T-bar supports of a suspended ceiling and/or one or more ceiling joists. For example, the system includes one or more expandable horizontal support bars that attach to the T-bar supports or the ceiling joists. The LED driver box can also include a ventricle support bracket for attaching to a building structure to provide additional vertical support for the LED driver box and an LED light fixture attached to the LED driver box.

In accordance with the embodiments of the invention, the LED driver box is configured to suspend one or more LED light fixtures through one or more suspension cables. The system is preferably adaptable for having one to four suspension cables for each LED driver box. Preferably, at least one of the suspension cables is also a power feed for powering an LED light fixture, referred to herein as a power-feed suspension mechanism. In accordance with the embodiments of the invention a power-feed suspension mechanism includes cables with at least one cable having direct current positive conductor and at least one cable having a direct current negative conductor.

The suspension system of the present invention includes one or more gantry leveling mechanisms that attache to a junction box or an LED driver box and one or more corresponding suspension cables. In operation suspension cables are attached to the gantry leveling mechanisms through suspension cable end attachments and the gantry leveling mechanisms are adjusted to level an attached or suspended light fixture.

In a particular embodiment of the invention, an angled LED driver junction box includes a junction box portion that is preferably rectangular. A receptacle opening of the junction box portion is configured to be flush with a ceiling structure when the angled LED driver junction box is installed. The angled LED driver junction box also includes a rectangular elongated driver box portion that is in volume communication with the junction box portion. The rectangular elongated driver box portion extends out from the junction box portion at an angle relative to the plane of the receptacle opening of the junction box portion, such that elongated modular LED driver circuits (that are as long as the rectangular elongated driver box portion is deep) are capable of being installed into the in the rectangular elongated driver box portion through the receptacle opening of the junction box portion.

With the angled LED driver junction box installed, the rectangular elongated driver box portion is preferably positioned with a bottom surface and a top surface of the rectangular elongated driver box portion angled between 40 and 20 degree relative to the ceiling structure and/or the plane of the receptacle opening of the junction box portion. The rectangular elongated driver box portion is configured to hold one or two modular LED driver circuits. The junction box portion of the LED driver box preferably includes one or more gantry leveling mechanisms, such as described below.

The gantry leveling mechanism of the present invention includes a bracket portion that attaches to a junction box or junction box portion of an LED driver box, such as described above. The gantry leveling mechanism also includes a hook plate or support portion that allows a suspension cable to be coupled to gantry leveling mechanism. The hook plate or support plate portion includes a slotted and curved finger structure that a support cable is fitted through and support thereon through by a suspension cable end attachment. The hook plate or support plate portion also includes a tab structure with a threaded hole. The tab structure is configured to fit through a slot formed between two bar structures on the bracket portion.

The gantry leveling mechanism also has a treaded screw feature that fits through a holed on a bottom surface of the bracket portion and threads into the threaded hole on the tab structure of the hook plate or support plate portion. The threaded screw feature then terminates through a treaded nut feature on a top surface of the bracket portion.

In operation the threaded screw feature is turned cockwise or counter clock-wise from a tool fitted end of the threaded screw feature at or near the bottom surface of the bracket portion using, for example, a screw driver or allen wrench, to thereby move the hook plate or support plate portion up or down in the slot formed between two bar structures on the bracket portion of the gantry leveling mechanism.

Accordingly, a light fixture that is supported by the suspension cable and attached to the gantry leveling mechanism is moved up and down relative to the attached junction box or attached LED diver box and the ceiling structure. A leveling mechanism for a light fixture can include any number of gantry leveling mechanisms described above that are suitable the light fixture being used.

In accordance with further embodiments of the invention an LED light fixture, that is coupled to and suspended from the LED driver box is formed from modular lighting units or lighting elements. A lighting element includes a housing, one or more diffusion lenses and a linear array of LEDs. The linear arrays of LEDs include, for example 20 or more light emitting diodes that each use 0.2 watts or less of electrical power. The system can also include a controller or dimming circuit to provide dimming control of light emitted from the linear arrays of LEDs. Where the LED light fixture provides both upward lighting and downward light, the controller or dimming circuit is configured to provide independent control of the upward lighting and downward light emitted from the linear arrays of LEDs.

The lighting elements of the present invention are used to make light fixtures having any number of geometric shapes including, but not limited to square, rectangular, triangular, pentagonal and hexagonal shapes, to name a few. As described above, the lighting elements are configured to provide, upward light, downward light or any combination thereof. Additional features of LED light fixtures formed from the lighting elements are described in U.S. patent Ser. No. 13/507,542, filed Jul. 9, 2012 and titled "LIGHT EMITTING DIODE LUMINAIRE DEVICE AND SYSTEM" and the Provisional Patent Application No. 61/796,717, filed Nov. 19, 2012 and titled "LED LUMINAIRE DEVICE AND SYSTEM," the contents of which are both hereby incorporated by reference.

BRIEF DESCRIPTION OF THE DRAWINGS

FIG. 9B shows adjusting the gantry leveling mechanisms shown in FIG. 9A, in accordance with the embodiments of the invention.

FIG. 11B shows a schematic representation of a junction box, an angled LED driver junction box, a high-volume LED driver junction box and a low-profile LED driver junction box mounted to or suspended from a T-bar ceiling structure.

DETAILED DESCRIPTION OF THE INVENTION

Figure 1A:
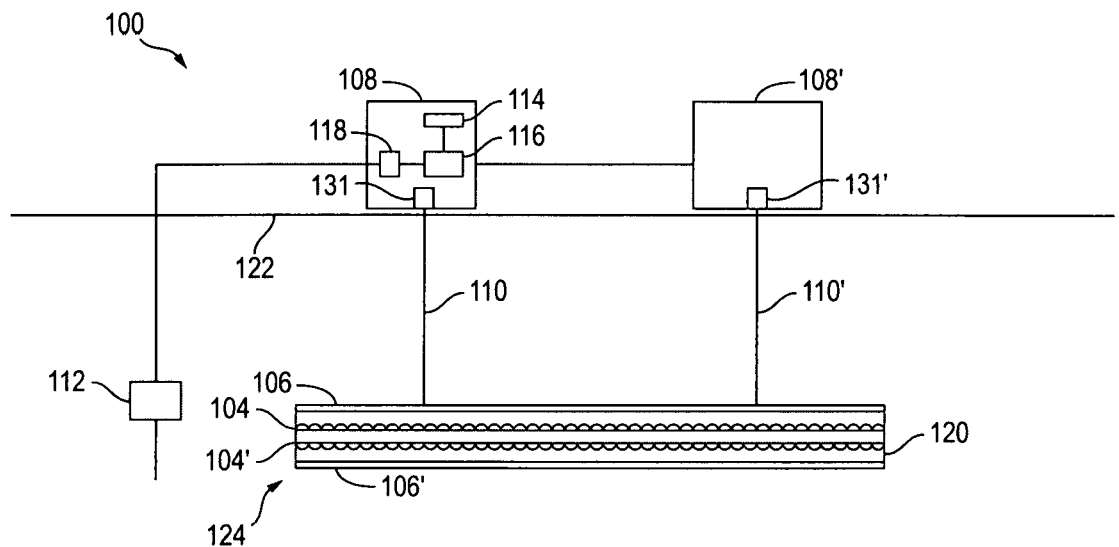
FIG. 1A is a schematic representation of an LED lighting system, in accordance with the embodiments of the invention.

FIG. 1A is a schematic representation of an LED lighting system 100, in accordance with the embodiments of the invention. The lighting system 100 of the present invention includes recessed or a low-profile LED driver boxes 108 and 108' that couple to portions of a ceiling 122. At least one of the LED driver boxes 108 houses one or more LED drivers or driver circuits 116 that power one or more LED light fixtures 124.

The LED light fixture 124 includes a housing 120, one or more diffusion lenses 106 and 106' and linear arrays of LEDs 104 and 104'. The linear arrays of LEDs 104 and 104' include, for example 20 or more light emitting diodes that each use 0.2 watts or less of electrical power. The system 100 can also include a controller or dimming circuit 118 to provide dimming control of light emitted from the linear arrays of LEDs 104 and 104'. Where the and linear arrays of LEDs 104 and 104' provides both upward lighting and downward light, the controller or dimming circuit 118 is configured to provide independent control of the upward lighting and downward lighting emitted from the linear arrays of LEDs 104 and 104'.

The control controller or dimming circuit 118 and the LED driver or driver circuit 116 are electrically coupled to a load circuit 112 for providing direct current power to the LED light fixture 124 through the LED driver or driver circuit 116. In accordance with the embodiments of the invention, the system 100 includes suspension mechanisms for suspending the LED light fixture 124 from the LED driver boxes 108 and 108'. The suspension mechanisms include, for example suspension cables 110 and 110' and leveling mechanisms 131 and 131', such as a gantry leveling mechanism illustrated in FIGS. 8A-C.

In this embodiment the suspension cable 110 is also a direct current positive conductor that feeds from one end of the LED light fixture to route direct current to a direct current negative conductor 110' through the plenum at an opposite end of the LED light fixture 124. The system 100 can also include a back-up battery 114, either within the LED driver box 108 or outside of the LED driver box 108. The back-up battery 114 is coupled to the power-feed suspension mechanism 110 and 110' for providing power to the LED light fixture 124 in the event of a power failure.

Figure 1B:
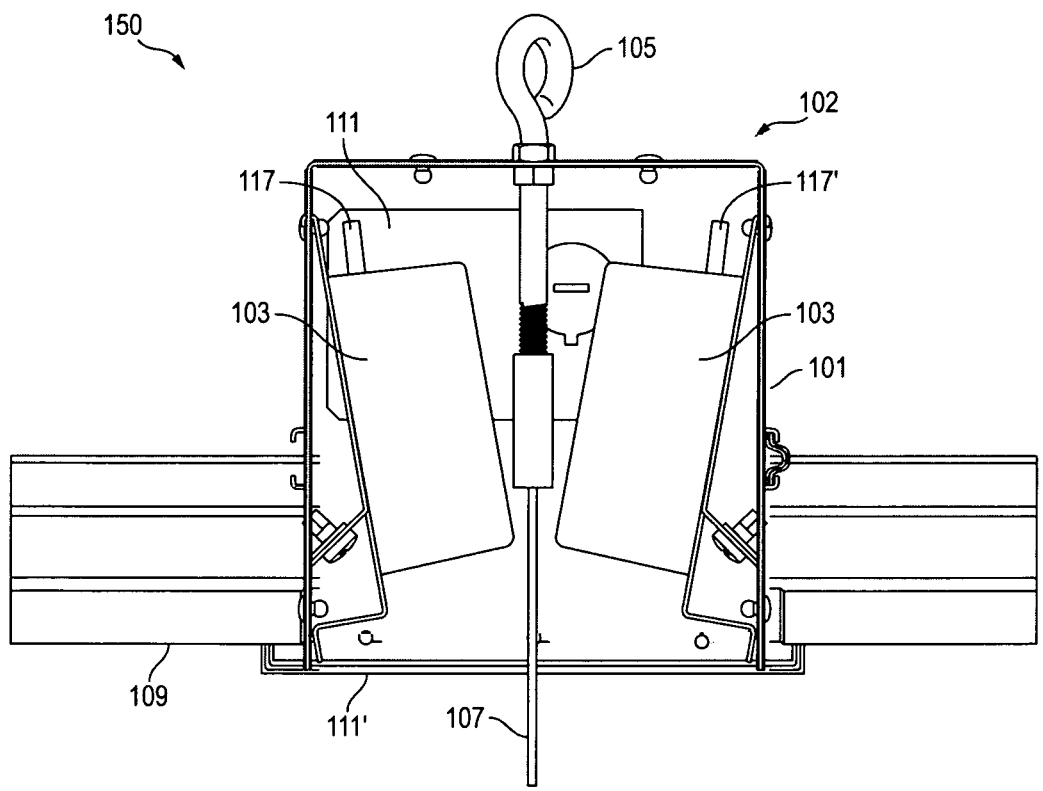
FIG. 1B shows a cross-sectional view of a recessed LED driver box with two LED drivers, in accordance with the embodiments of the invention.

FIG. 1B shows a cross-sectional view 150 of an LED driver box 102 with a housing 101 for housing two LED drivers 103 and 103'. In accordance with the embodiments of the invention, the LED drivers 103 and 103' are vertically stacked or horizontally stacked within the LED driver box 102. The LED drivers 103 and 103' individually or collectively provide 40 watts, or more, of power. The LED driver box 102 includes one or more service doors 111 and 111' or service plates 111 and 111' to access and/or service the LED drivers 103 and 103' any electrical connections therein. Preferably, the LED drivers 103 and 103' are coupled to a load circuit and one or more light through quick-lock or snap connectors 117 and 117'. Accordingly, the LED drivers 103 and 103' can be readily replaced when a power failure occurs without requiring rewiring of the lighting system 100 (FIG. 1).

The LED driver box 102 of the present invention also includes a ventricle support bracket 105 for attaching to a building structure to provide additional vertical support for the LED driver box 102 with an LED light fixture attached to the LED driver box 101 through, for example a suspension cable 107. The LED driver box 102 can also include mechanism to attach and secure the LED driver box to one or more T-bar supports 109 of a suspended ceiling and or one or more ceiling joists.

Figure 2:
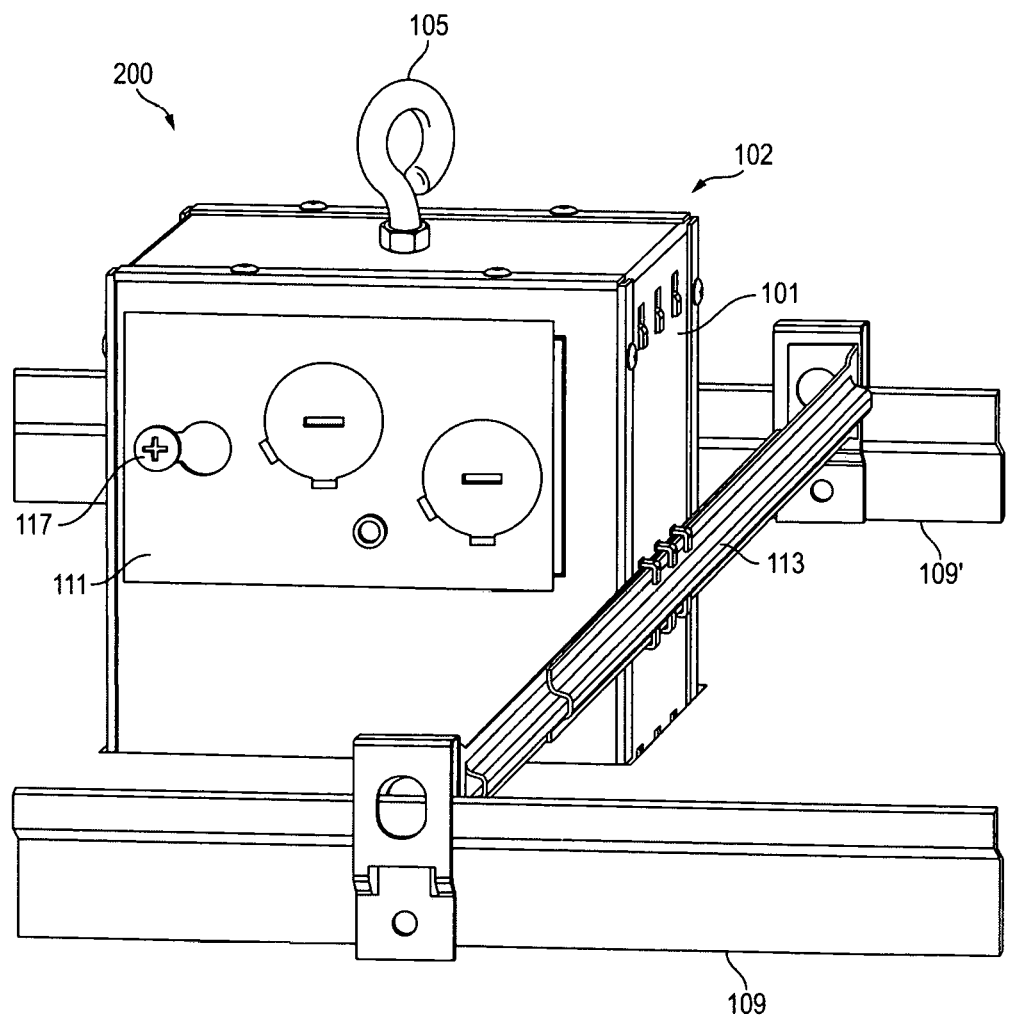
FIG. 2 shows a perspective view of a recessed LED driver box coupled to T-bar of a suspension ceiling through an expandable horizontal support bar, in accordance with the embodiments of the invention.

FIG. 2 shows a perspective view 200 of the LED driver box 102 coupled to T-bars 109 and 109' of a suspension ceiling through an expandable horizontal support bar 113, in accordance with the embodiments of the invention. As above, the LED driver box 102 includes a housing 101 for housing two LED drivers 103 and 103' (FIG. 1B) and can also have a ventricle support bracket 105 for providing additional vertical support for the LED driver box 102 with an LED light fixture attached thereto. The LED driver box 102 has a service door or service plate 111 that can be opened by removing, for example, a screw feature 117. The service door or service plate 111 also proves a port for attaching conduit and wiring to the two LED drivers 103 and 103' from a load circuit.

Figure 3:
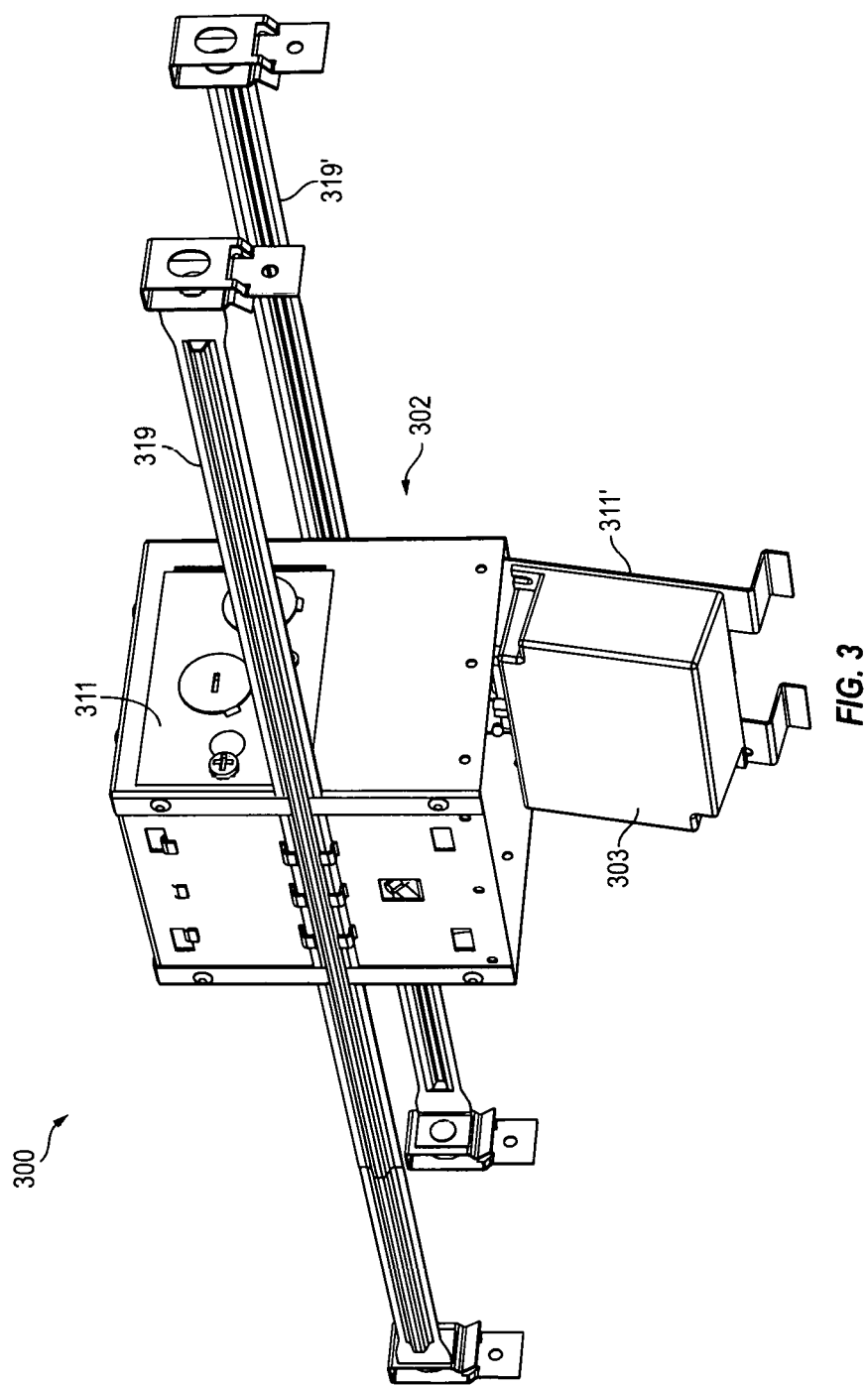
FIG. 3 shows a perspective view of a recessed LED driver box with a bottom access door for replacing or fixing an LED driver therein, in accordance with the embodiments of the invention.

FIG. 3 shows a perspective view 300 of a LED driver box 302 with a hinged bottom service door 311' for replacing or fixing an LED driver 303 therein, in accordance with the embodiments of the invention. The LED driver box 302 also includes a removable service plate 311 and is configured to couple to expandable horizontal support bars 319 and 319' for attaching to T-bar supports or ceiling joists, such as described previously.

Figure 4:
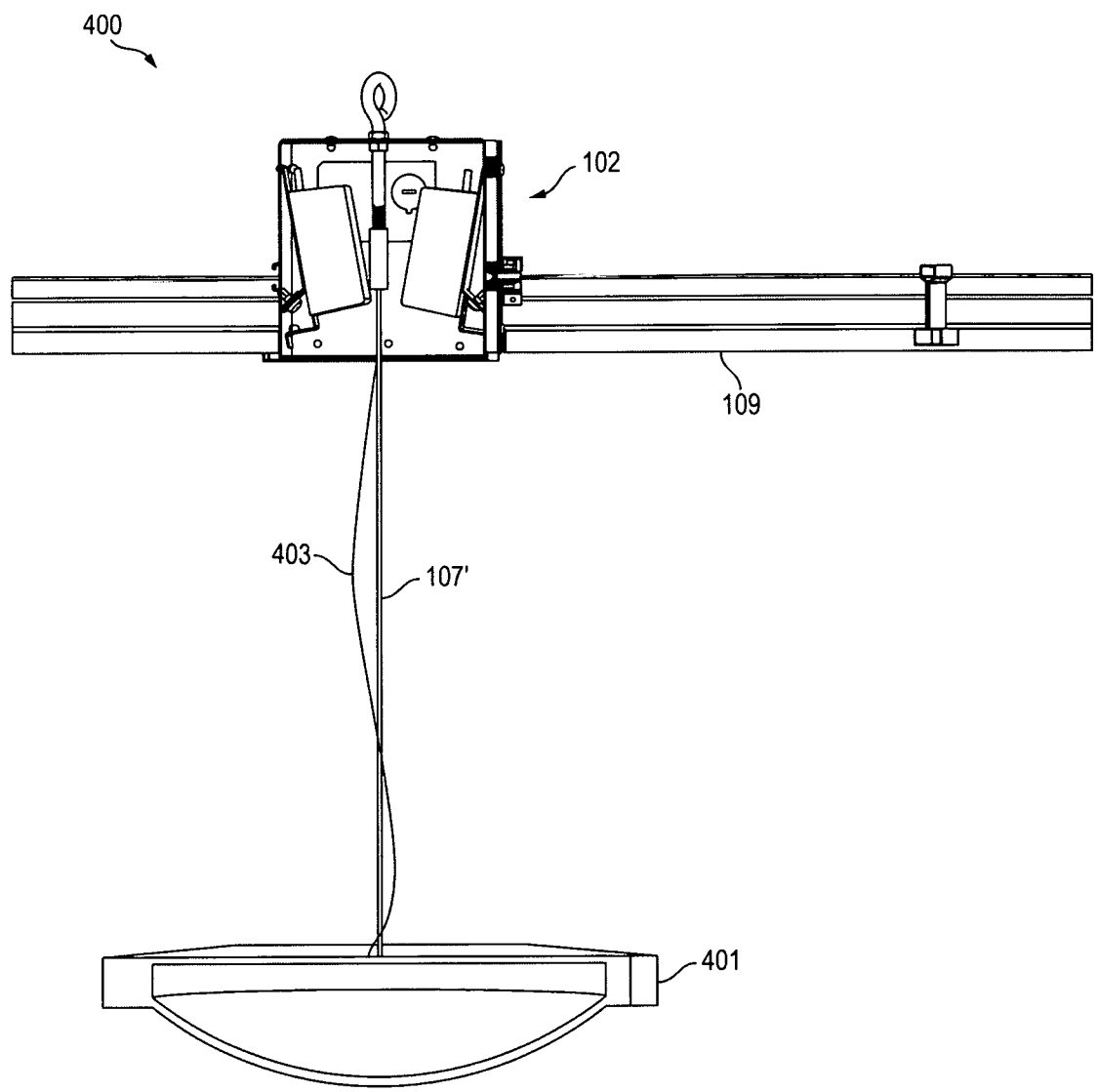
FIG. 4 shows a lighting system with an LED light fixture suspended from a recessed LED driver box, in accordance with the embodiments of the invention.

FIG. 4 shows a lighting system 400 with an LED light fixture 401 that is suspended from the LED driver box 102 of the present invention. The LED driver box 102 is attached to, for example, a T-bar 109 of a suspension ceiling. The LED light fixture is suspended through a suspension cable 107' and is powered by one or more of the LED drivers housed within the LED driver box 102 through a power feed 403.

Figure 5:
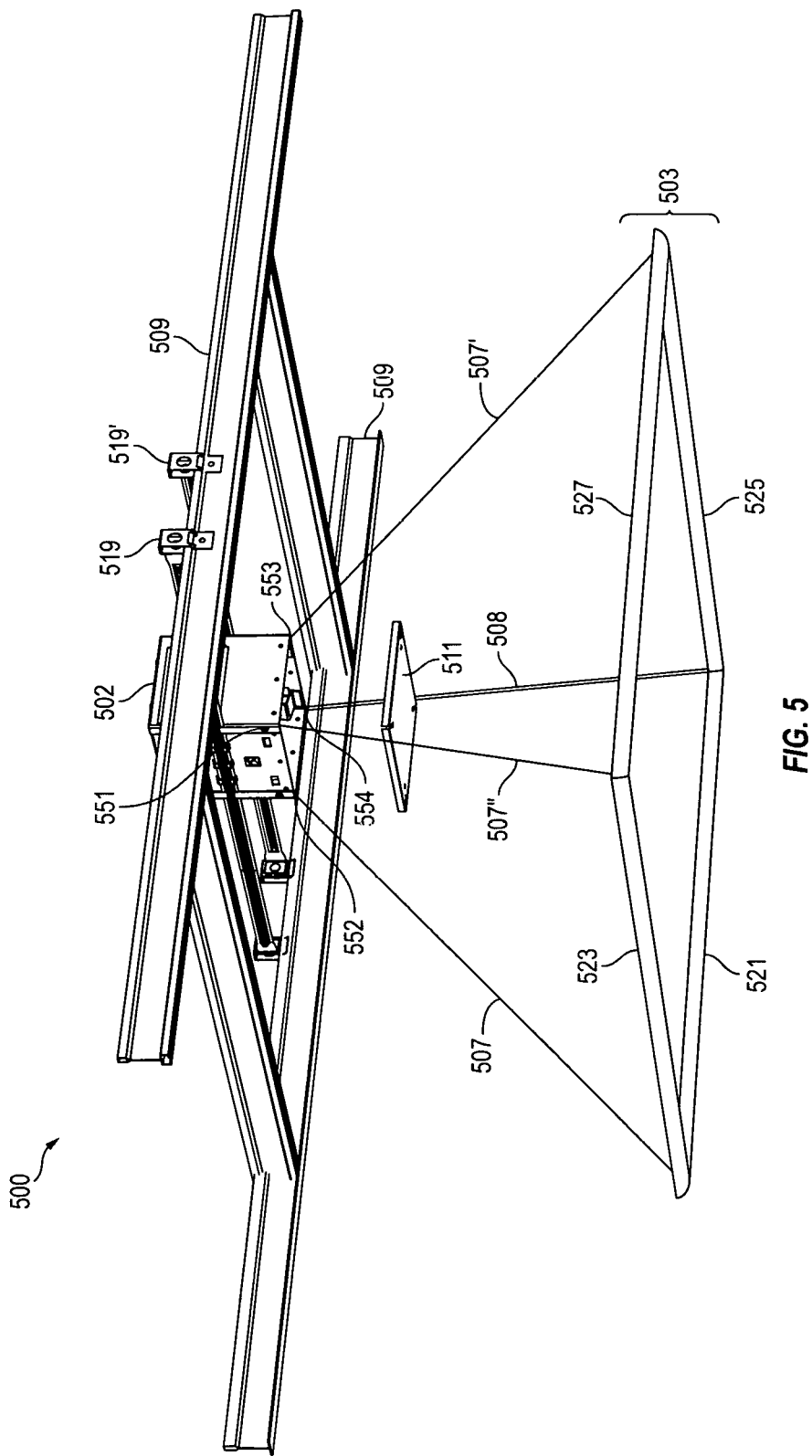
FIG. 5 shows a lighting system with a light fixture formed from modular lighting elements and being suspended from recessed LED driver box, in accordance with the embodiments of the invention.

FIG. 5 shows a lighting system 500 with an LED light fixture 503 that is formed from modular lighting elements 521, 523, 525 and 527. In accordance with a preferred embodiment of the invention, the LED light fixture 503 is suspended from an LED driver box 502 by a power-feed suspension mechanism comprising any number of suspension cables 507, 507', 507" and 508. The suspension cables 507, 507', 507" and 508 are preferably coupled to gantry leveling mechanisms 551, 552, 553, 554 through suspension cable end attachments, such as described with reference to FIGS. 8A-C and FIG. 9A.

The power-feed suspension mechanism includes at least one suspension cable 508 that provides a direct current positive conductor and a direct current negative conductor for providing power to the LED light fixture 503. Alternatively, any of the other suspension cables 507, 507', 507" can have a direct current positive conductor and/or direct current negative conductor for providing power to the LED light fixture 503. While the power-feed suspension mechanism is shown here with four suspension cables, the lighting system 500 of the present invention is preferably adaptable to have a power-feed suspension mechanism with one to four suspension cables.

As described above, the LED driver box 502 includes one or more LED drivers or driver circuits for powering the LED light fixture 503 through the power-feed suspension mechanism. The LED driver box 502 has one or more service doors or service plates 511 to access and/or service the LED drivers and any electrical connections contained within the LED driver box 502. The LED driver box 502 is configured to couple to expandable horizontal support bars 519 and 519' for attaching to T-bar supports 509 and 509' or ceiling joists, such as described previously.

Figure 6:
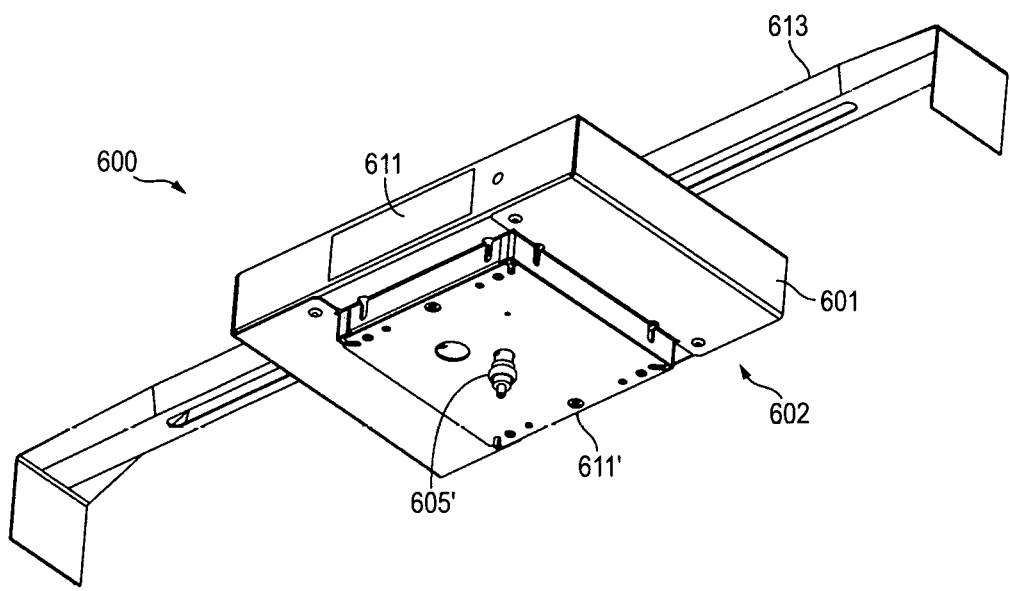
FIG. 6 shows a schematic representation of a low-profile recessed LED driver box, in accordance with the embodiments of the invention.

FIG. 6 shows a schematic representation of a low-profile LED driver box 602, in accordance with the embodiments of the invention. The low-profile LED driver box 602 is particularly well suit for installing LED lighting systems where there is very little clearance between a ceiling and other building structures. The low-profile LED driver box 602 includes a housing for housing two ore more LED drivers or driver circuits 609 and 609' (FIG. 7) is configured to couple to an expandable horizontal support bar 613 that include a support stud 605' that passed through the low-profile LED driver box 602. The expandable horizontal support bar 613 is used to attach the low-profile LED driver box 602 to T-bar supports or ceiling joists. The low-profile LED driver includes one or more service doors 611' or service plates 611 that can be opened to service the low-profile LED driver box 602. The service plate 611 also proves a port for attaching conduit and wiring to the low-profile LED driver box 602 from a load circuit.

Figure 7:
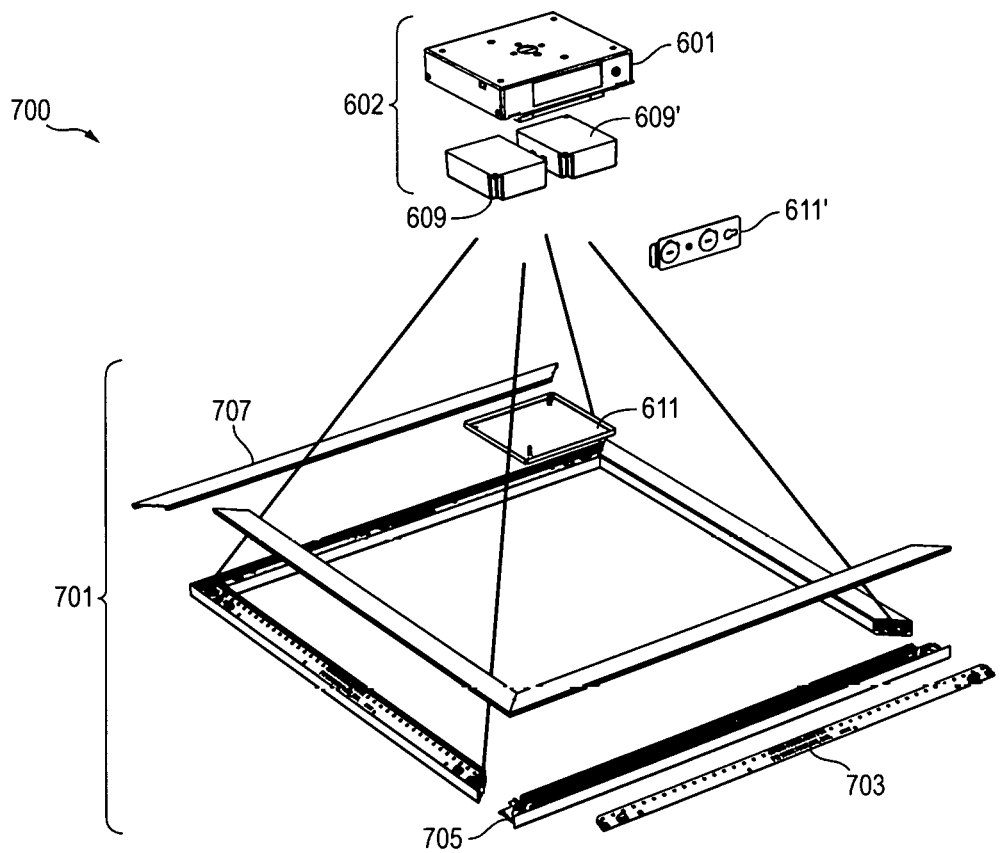
FIG. 7 shows and exploded view of a lighting system with a low-profile recessed LED driver box and a light fixture formed from modular lighting elements, in accordance with the embodiments of the invention.

FIG. 7 shows and exploded view 700 of a lighting system with a low-profile LED driver box 602 and an LED light fixture 701 that is formed from modular lighting elements, in accordance with the embodiments of the invention. The low-profile LED driver box 602 includes a housing 601 and the two or more LED drivers or driver circuits 609 and 609'. The low-profile LED driver box 602 also includes a service plate 611' and a bottom service door 611' (FIG. 6), as described above. The low-profile LED driver box 602 also preferably includes a canopy plate 611 that covers the bottom service door 611' an engages suspension cables of a power-feed suspension mechanism. The LED light fixture 701 is formed from lighting elements that include a top portion 707 with a top diffuser lense, a bottom portion 705 with a bottom diffuser lense and one or more linear arrays of LEDs 703.

Figure 8A:
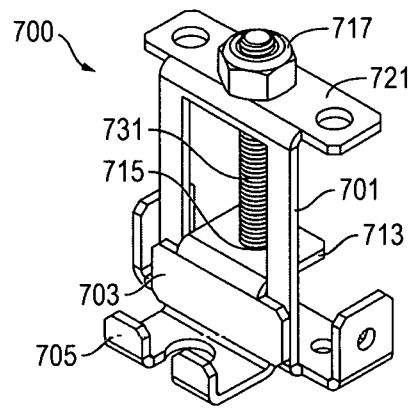
FIGS. 8A-C show views of a gantry leveling mechanism that attaches to a junction box or LED driver box for leveling light fixtures, in accordance with the embodiments of the invention.
Figure 8B:
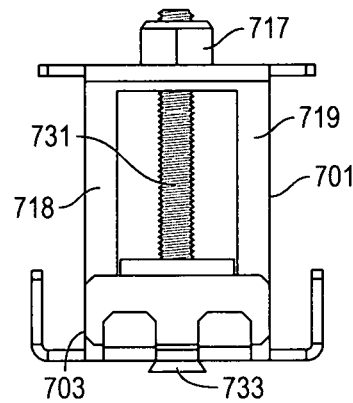
Figure 8C:
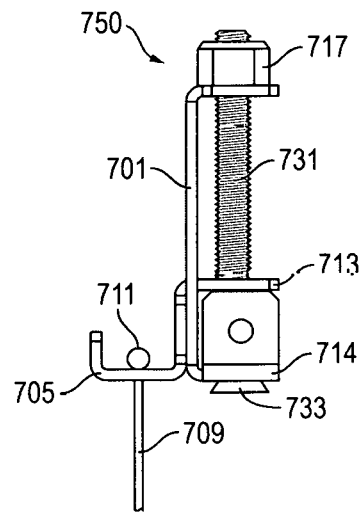

FIGS. 8A-C show views 700, 725 and 750 of a gantry leveling mechanism for leveling light fixtures. The gantry leveling mechanism of the present invention include a bracket portion 701 that attaches to a junction box or junction box portion of an LED driver box, such as described above. The gantry leveling mechanism also includes a hook plate or support portion 703 that allows a suspension cable 709 to be coupled to gantry leveling mechanism. The hook plate or support plate portion 703 includes a slotted and curved finger structure 705 that a support cable 709 is fitted through and support thereon through by a suspension cable end attachment 711. The hook plate or support plate portion 703 also include a tab structure 713 with a threaded hole 715. The tab structure 713 is configured to fit through a slot formed between two bar structures 718 and 719 on the bracket portion 701.

The gantry leveling mechanism also has a treaded screw feature 731 that fits through a hole on a bottom surface 714 of the bracket portion 701 and threads into the threaded hole 715 on the tab structure 713 of the hook plate or support plate portion 703. The threaded screw feature 731 then terminates through a treaded nut feature 717 on a top surface 721 of the bracket portion 701.

In operation the threaded screw feature 731 is turned cock-wise or counter clock-wise from a tool fitted end 733 of the threaded screw feature 731 at or near the bottom surface of the surface 714 of the bracket portion 701 using, for example, a screw driver or allen wrench, to thereby move the hook plate or support plate portion 703 up or down in the slot formed between two bar structures 718 and 719 on the bracket portion 701 of the gantry leveling mechanism.

Accordingly, a light fixture that is supported to the suspension cable 709 attached to the gantry leveling mechanism is moved up and down relative to the attached junction box or attached LED diver box and the ceiling. A leveling mechanism for a light fixture can include any number of gantry leveling mechanisms described above that are suitable for the light fixture being used.

Figure 8D:
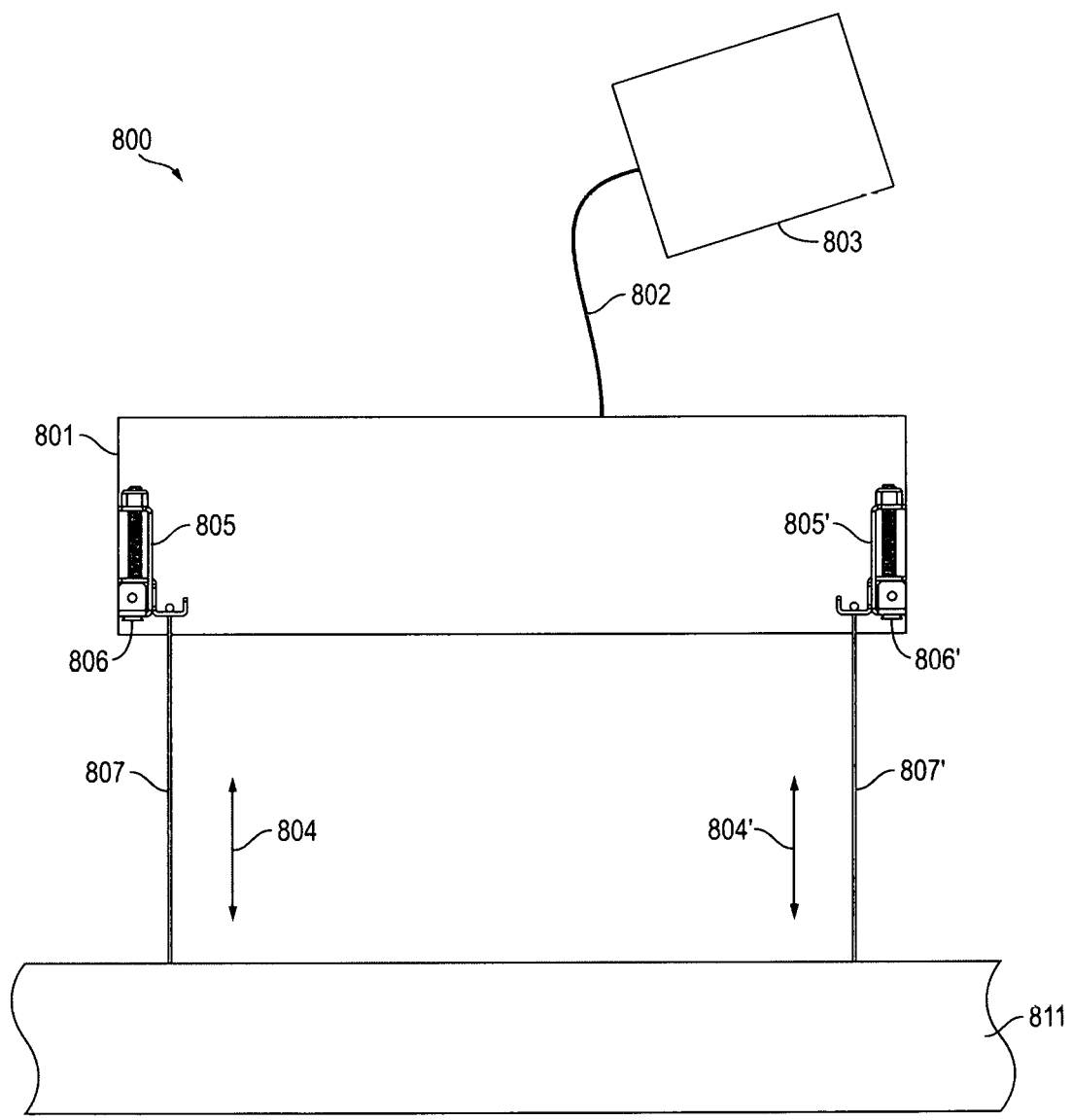
FIG. 8D shows a schematic view of a light fixture suspended by two cables attached to two gantry leveling mechanisms, in accordance with the embodiments of the invention.

FIG. 8D shows a schematic view of a lighting system 800 with light fixture 811 suspended by two suspension cables 807 and 807' attached to two gantry leveling mechanisms 805 and 805'. In operation, the suspended light fixture 811 is leveled by turning the tool fitted ends 806 and 806' of the gantry leveling mechanisms 805 and 805', such as described above an below to move ends of the light fixture 811 up or down, as indicated by the arrows 804 and 804'. The gantry leveling mechanisms 805 and 805' are attached to a junction box, an LED driver junction box or any other suitable electrical box represented by 801. The lighting system 800 can include a remote power box 803 for housing LED driver circuits that power the light fixture 811 through suitable electrical connections, represented by 802.

Figure 8E:
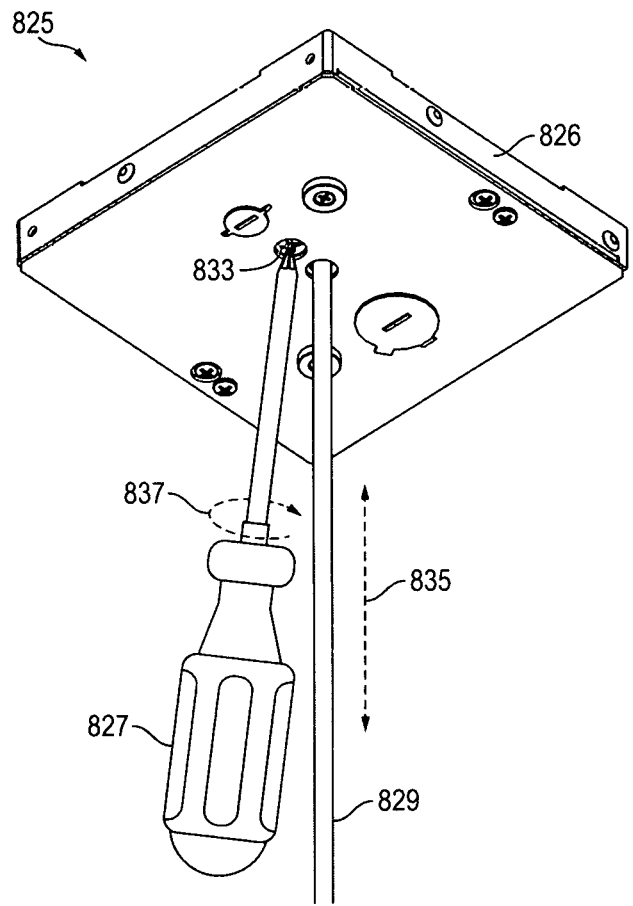
FIG. 8E illustrates adjusting the leveling of a support cable through tool fitted end of the threaded screw feature of a gantry leveling mechanism, in accordance with the embodiments of the invention.

FIG. 8E illustrates a view 825 showing how to adjust a gantry leveling mechanism, such as the gantry leveling mechanisms 805 and 805', that is coupled to a suspension cable 829, as described above and below. In operation with a face plate 826 is attached to the junction box (not show) and a tool fitted end 833 of a threaded screw feature 731 (FIGS. 8A-C) is exposed through a hole in the face plate. Using a screw driver 827, and allen wrench or other suitable tool, the threaded screw feature 731 is engaged with the tool and is turned cock-wise or counter clock-wise, as indicated by the arrow 837, to move the suspension cable. 829 up or down, as indicated by the arrow 835.

Figure 8F:
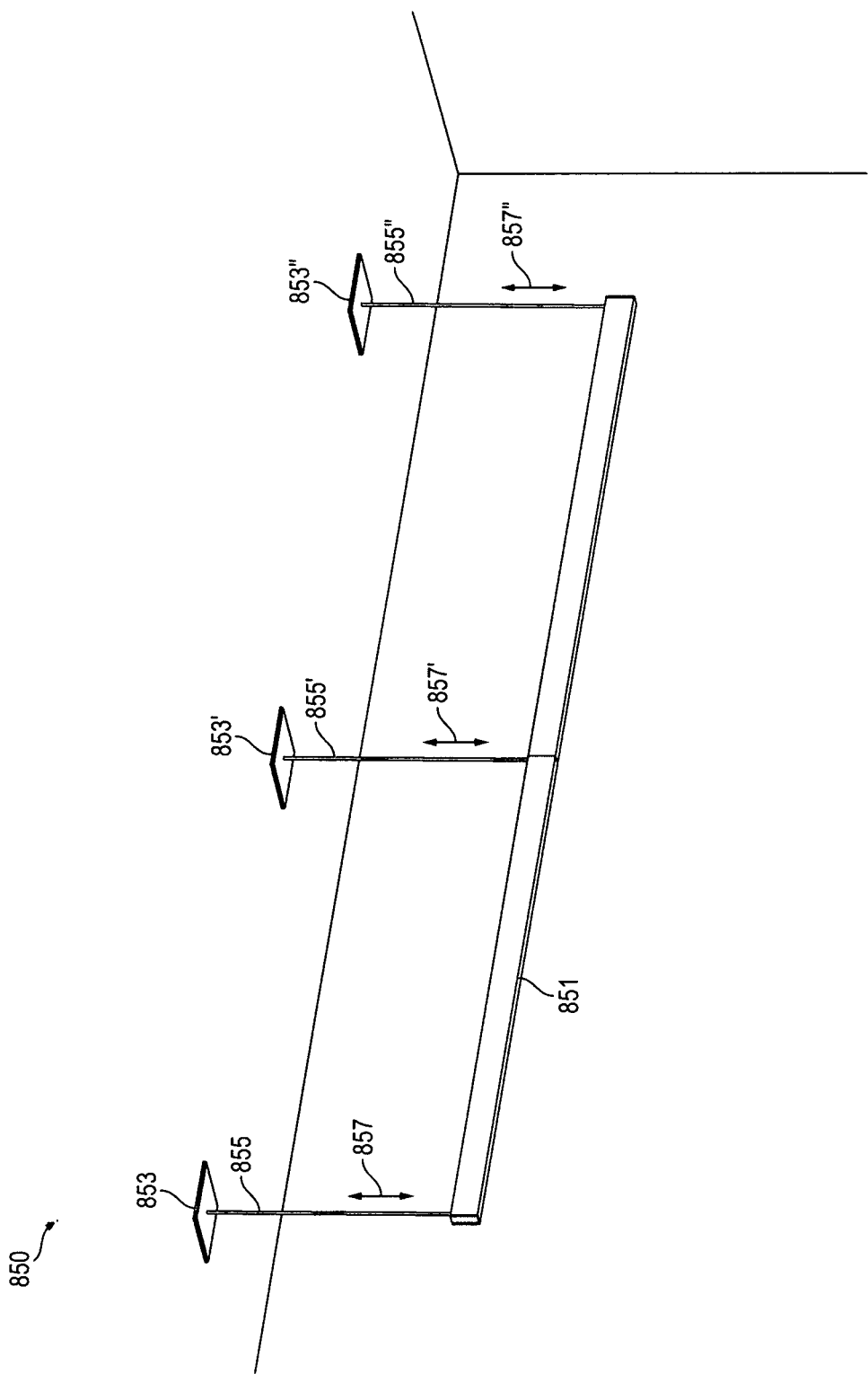
FIG. 8F shows a light fixture with a three point suspension mechanism that includes three independently adjustable gantry leveling mechanisms for leveling the light fixture, in accordance with the embodiments of the invention.

FIG. 8F shows a view 850 of a light fixture 851 that is suspended with three suspension cables 855, 855' and 855". Each of the three suspension location 853, 853' and 853" include an independently adjustable gantry leveling mechanism with a face plate, such as described above with reference to FIG. 8E for leveling the light fixture 851. Accordingly, each of the three suspension cables 855, 855' and 855" can be independently adjusted up or down, as indicated by the arrows 857, 857' and 857', to level the light fixture 851.

Figure 9A:
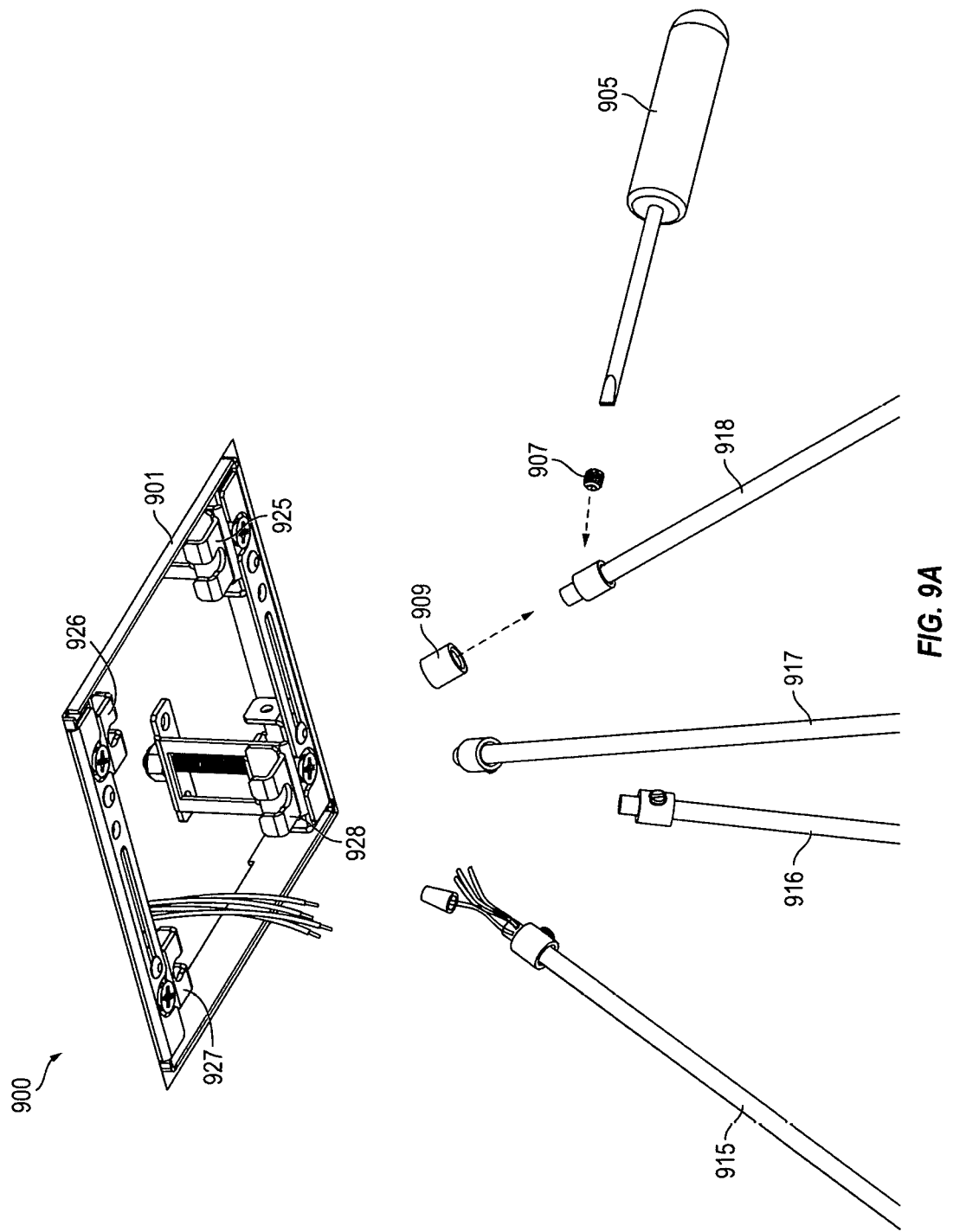
FIG. 9A shows a view of a junction box with four gantry leveling mechanisms for attaching to four corresponding suspension cables through suspension cable end attachments, in accordance with the embodiments of the invention.

FIG. 9A shows a view 900 of a junction box 901 with four gantry leveling mechanisms 925, 926, 927 and 928 for attaching to four corresponding suspension cables 915, 916, 917 and 918 with suspension cable end attachments 909. In operation, suspension cable end attachments 909 are attached to ends of each of the suspension cables 915, 916, 917 and 918 using for examples a treaded set screw 907 that is secured using a screw driver 905, and allen wrench or other suitable tool. Note that the suspension cable 915 is also a power cable as described in detail above with reference to FIG. 5.

Referring to FIG. 9B, suspension cables 915', 916', 917' and 918' with the suspension cable end attachments 909 installed are inserted into the slotted and curved finger structures 705 (FIGS. 8A-C) on each of the gantry leveling mechanisms 925, 926, 927 and 928 (FIG. 9A) and a face plate 926 is installed over the junction box 901 opening. Each of the suspension cables 915', 916', 917' and 918' are then capable of being independently adjusted up or down, as indicated by the arrow 919, by turning tool fitted ends 933 on threaded screw features 731 (FIGS. 8A-C) on each of the gantry leveling mechanisms 925, 926, 927 and 928 using a screw driver 935, allen wrench or other suitable tool.

Figure 9C:
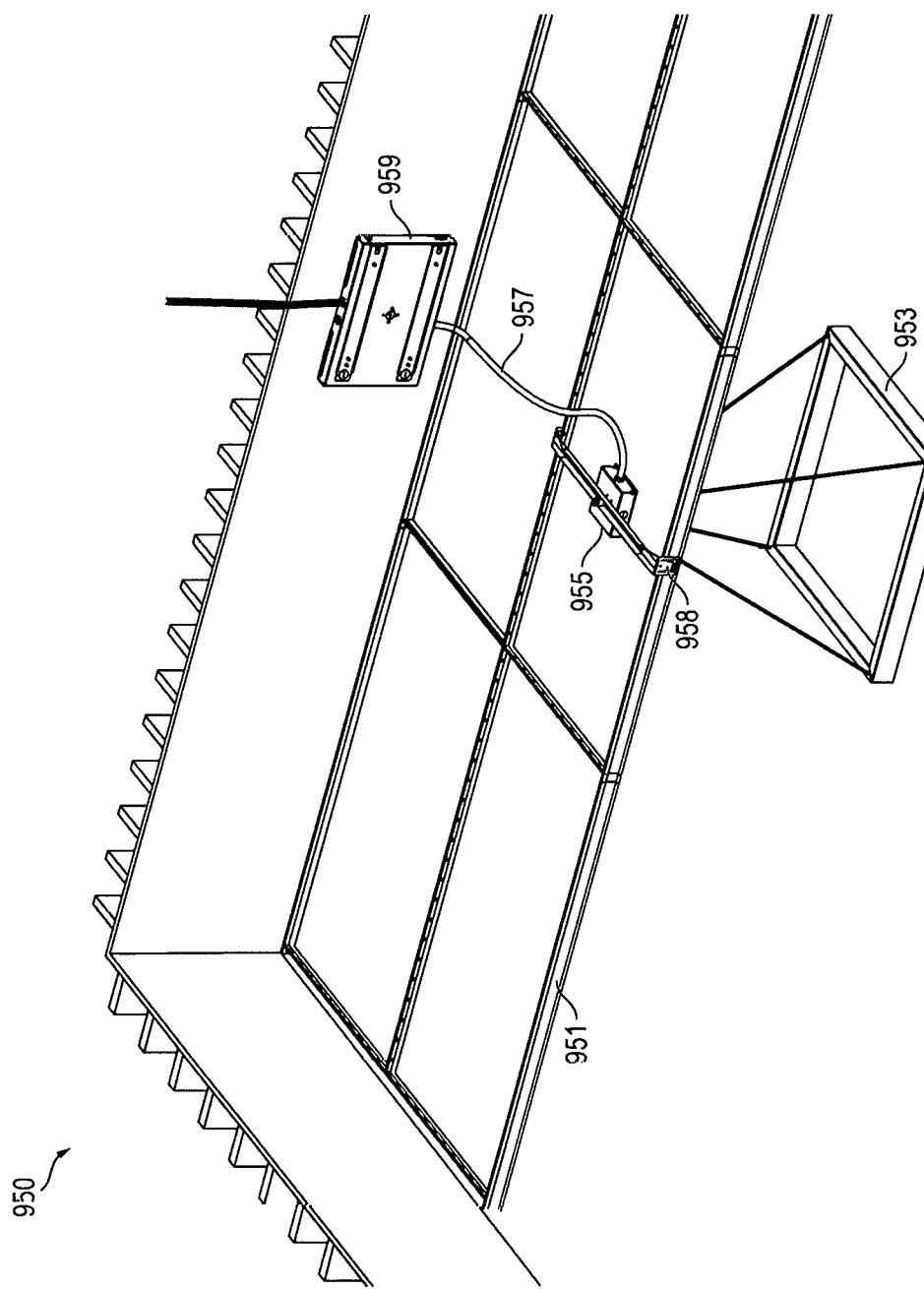
FIG. 9C shows a four point suspended light fixture suspended by a junction box with gantry leveling mechanisms, as shown in FIG. 9A-B and a remote LED driver box for powering the four point suspended light fixture, in accordance with the embodiments of the invention.

FIG. 9C shows view of a lighting system 950 with a an LED light fixture 953 that is formed from modular lighting elements 521, 523, 525 and 527 (FIG. 5). The LED light fixture 953 is suspended from a four point gantry leveling junction box 955, shown and described in detail with reference to FIGS. 9A-B. The four point gantry leveling junction box 955 is attached to a T-bar suspension ceiling structure 951 using a T-bar bracket 958. The LED light fixture 953 is powered by a remote power box 959 that houses one to more LED driver circuits and provides power to the four point gantry leveling junction box 955 and the LED light fixture 953 through suitable electrical connections 957.

Figure 10A:
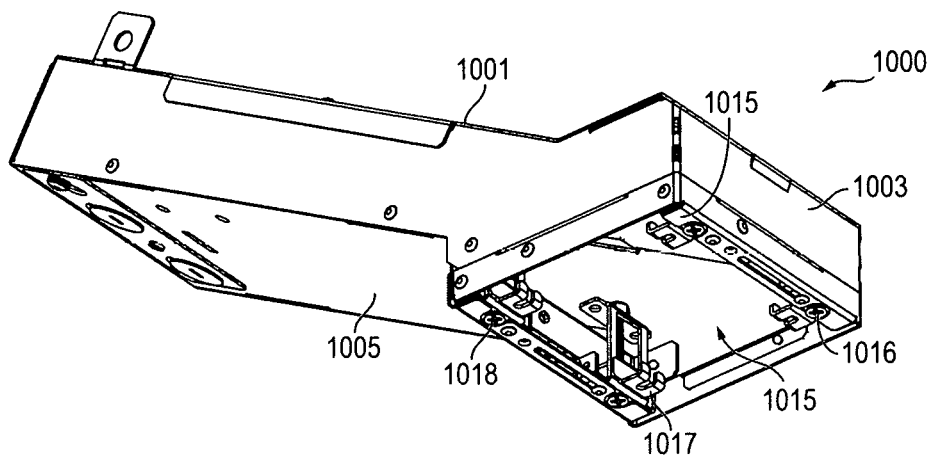
FIG. 10A shows a view of an angled LED driver box and junction box combination (LED driver junction box) with four corner gantry leveling mechanisms, in accordance with the embodiments of the invention.
Figure 10B:
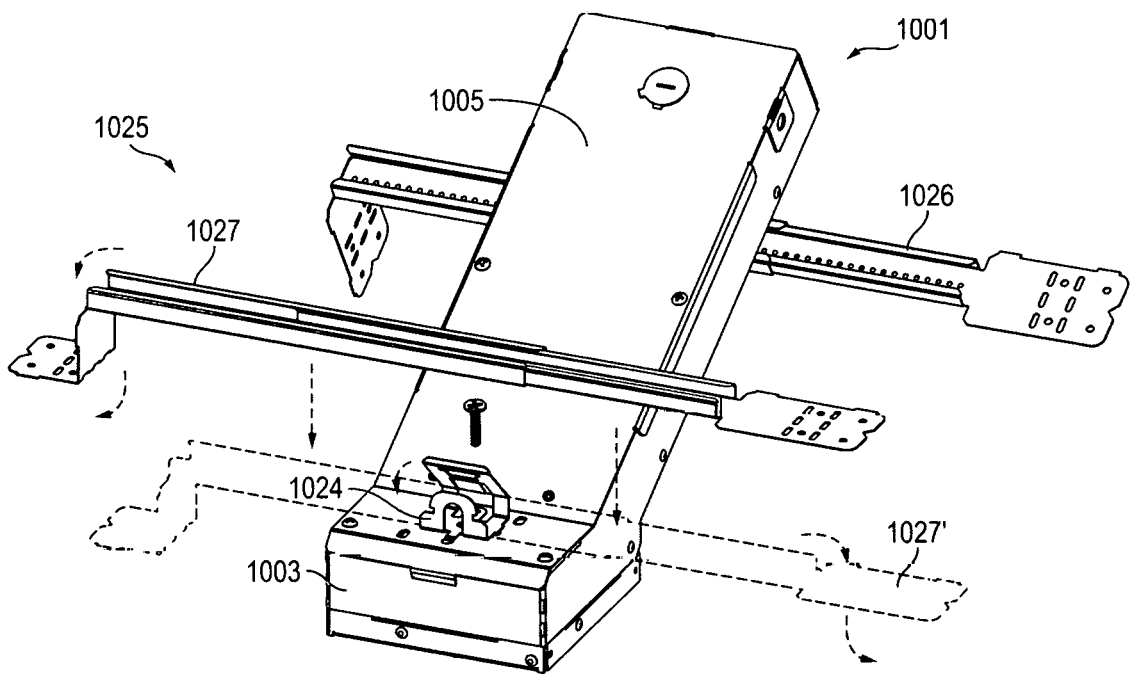
FIG. 10B shows the angled LED driver junction box shown in FIG. 10A with mounting brackets for attaching the angled LED driver junction box to ceiling joists, in accordance with the embodiments of the invention.

FIG. 10A-B show a views 1000 and 1025 of an angled LED driver box and junction box combination (angled LED driver junction box) 1001. As shown the angled LED driver junction box 1001 includes a four point gantry leveling mechanisms 1015, 1016, 1017 and 1018, described above. The angled LED driver junction box 1001 includes a junction box portion 1003 that is preferably rectangular and with a receptacle opening 1015 that is configured to be flush with a ceiling when the angled LED driver junction box is installed. The angled LED driver junction box also includes a rectangular elongated driver box portion 1005 that is in volume communication with the junction box portion 1003. The rectangular elongated driver box portion 1005 extends out from the junction box portion 1003 at an angle relative to the plane of the receptacle opening 1015 of the junction box portion 1003.

Referring to FIG. 10B, the angled LED driver junction box 1001 is configured to attach to any number of brackets 1026 and 2027 for installing the angled LED driver junction box 1001 to ceiling joists and or T-bar suspended ceiling structures. For example, and expandable bracket 1027 is secured to a portion of the angled LED driver junction box 1001, as indicated by 1027', through an clip structure 1024.

Figure 10C:
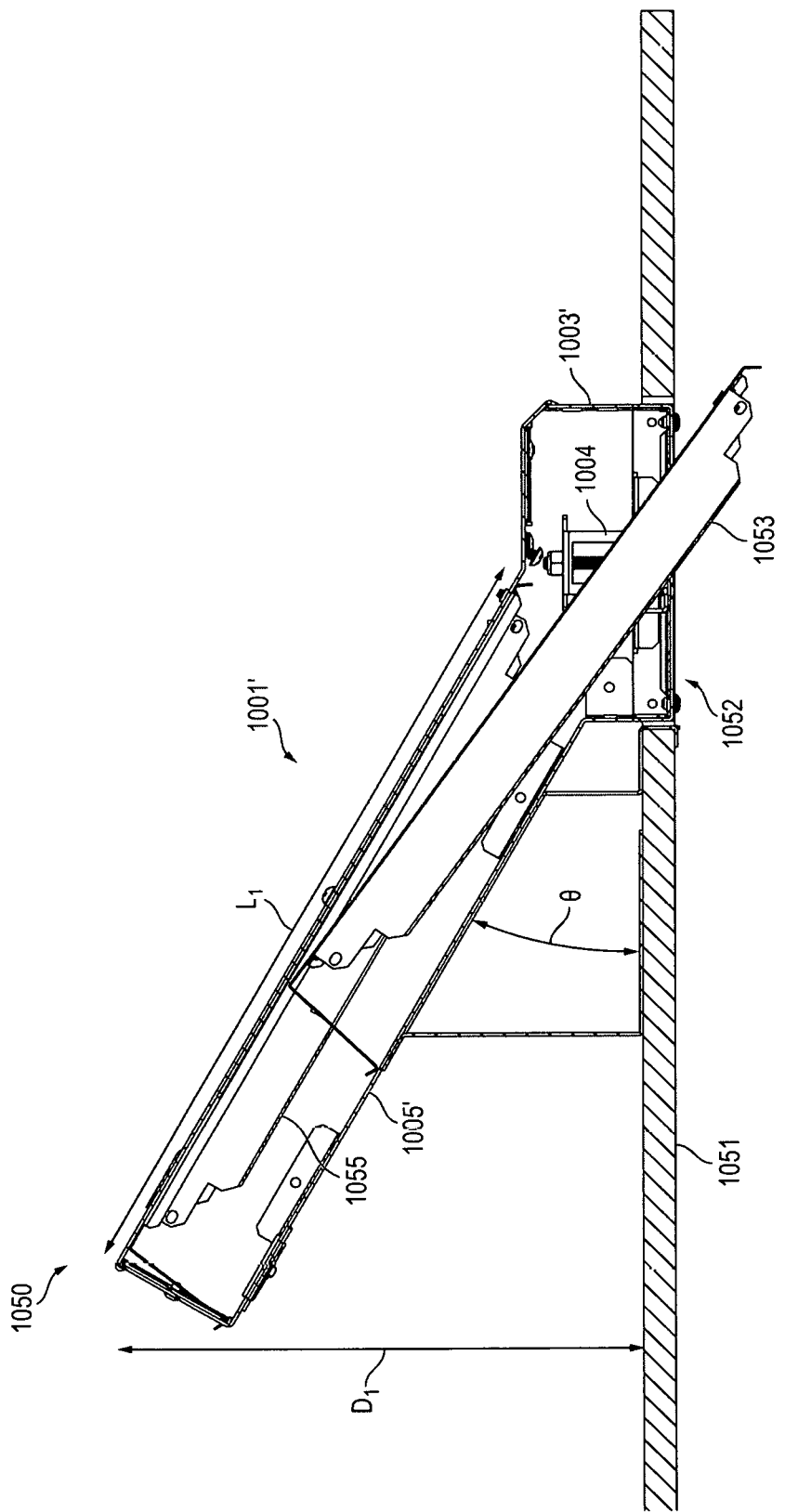
FIG. 10C shows a schematic side profile of an angled LED driver junction box, in accordance with the embodiments of the invention.

FIG. 10C shows a schematic side profile 1050 of an angled LED driver junction box 1001' installed into a ceiling structure 1051. As described above, when installed, the receptacle opening 1052 of a junction box portion 1003' is substantially planar with the surface of the ceiling structure 1051. The rectangular elongated driver box portion 1005' of the angled LED driver junction box 1001 is in volume communication with the junction box portion 1003' and is deep enough, as indicated by the arrow $L_1$, such that one or two elongated modular quick connect LED driver circuits 1053 and 1055 are capable of being installed into the in the rectangular elongated driver box portion 1005' through the receptacle opening 1052 of the junction box portion 1003'. The bottom surface and a top surface of the rectangular elongated driver box portion 1005' are posted a distance away from the ceiling structure 1051, as indicated by the arrow $D_1$, such that the rectangular elongated driver box portion 1005 is angled between 40 and 20 degree relative to the ceiling structure 1051 and/or the plane of the receptacle opening 1052 of the junction box portion 1003'. The junction box portion 1003 of the an angled LED driver junction box 1001' preferably includes one or more gantry leveling mechanisms, such as described in detail with reference to FIGS. 8A-C.

Figure 11A:
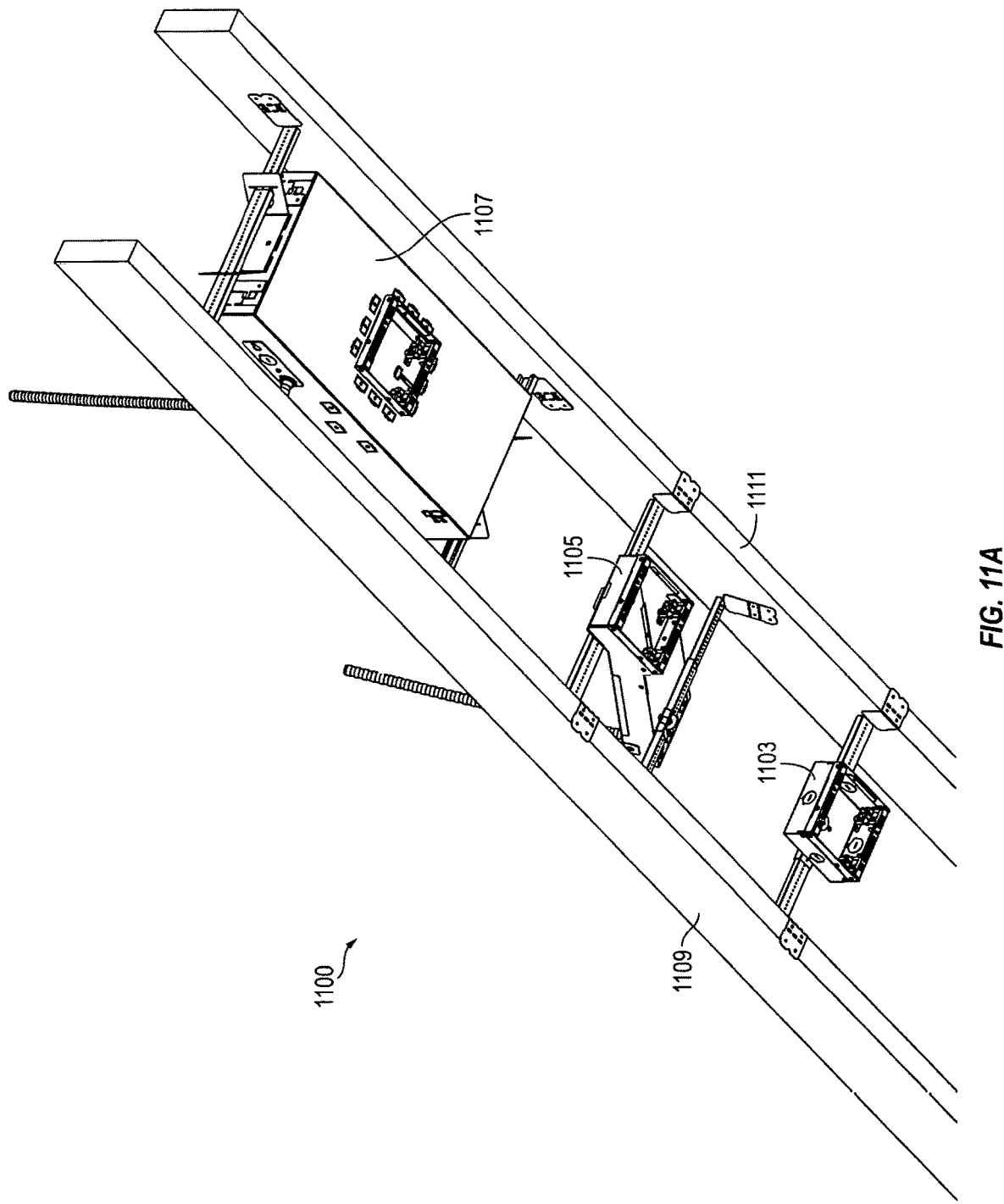
FIG. 11A shows a schematic representation of a junction box, an angled LED driver junction box and a high-volume LED driver junction box mounted to ceiling joists.

FIG. 11A shows a schematic representation 1100 of a junction box 1103 that can be electrically coupled to a remote power box 803 (FIG. 8D) for housing LED driver circuits that power a light fixture, an angled LED driver junction box 1105, such as described above with reference to FIGS. 10A-C, and a high-volume LED driver junction box 1107 mounted to ceiling joists 1109 and 1111. A lighting system of the present invention can include any, number and any combinations of junction boxes 1103, remote power boxes 803, angled LED driver junction boxes 1105, high-volume LED driver junction boxes 1107 and combinations thereof.

FIG. 11B shows a schematic representation 1125 of a junction box 1103', an angled LED driver junction box 1105', a high-volume LED driver junction box 1107' and a low-profile LED driver junction box 1109 coupled to suspended T-bar ceiling structure 1126. A lighting system of the present invention can include any number and any combinations of junction boxes 1103', remote power boxes 803 (FIG. 8D), angled LED driver junction boxes 1105', high-volume LED driver junction boxes 1107', low-profile LED driver junction boxes 1109 and combinations thereof.

The junction boxes 1103 and 1103', angled LED driver junction boxes 1105 and 1105', high-volume LED driver junction boxes 1107 and 1107', and low-profile LED driver junction box 1109 described above can includes any suitable number of gantry leveling mechanisms, such as described with reference to FIGS. 8A-C for leveling light fixtures attached thereto through suspensions cables.

The present invention provides a number of advantages overt prior art LED lighting systems. The recessed or low-profile driver box is de-coupled or separate from any LED light fixture that it provides power for. This allows for easy servicing of the LED drivers and the wiring within the LED driver box through service doors, panels or plates. Also, the LED light fixture is easy to service since the LED light fixture has minimal wiring and the linear arrays of LEDs withing the light fixture can be replaced when they fail. The position of the LED light fixture and the height of the LED light fixture is easily adjusted through suspension cables coupled to a junction box structure through gantry leveling mechanism described above. The LED driver box is readily adapted for one, two, three, four or more suspension cable configurations for supporting a variety of different LED light fixtures and/or for providing power to LED light fixtures through an integrated power-feed suspension mechanism.

The present invention has been described in terms of specific embodiments incorporating details to facilitate the understanding of the principles of construction and operation of the invention. As such, references herein to specific embodiments and details thereof are not intended to limit the scope of the claims appended hereto. It will be apparent to those skilled in the art that modifications can be made in the embodiments chosen for illustration without departing from the spirit and scope of the invention.

What is claimed is:

1. A lighting system comprising:
a) LED driver junction box with junction box portion;
b) a gantry mechanism attached to and positioned within the junction box portion, the gantry mechanism having a bracket portion that attaches to the junction box portion of the LED driver junction box and a hook plate with a tab structure that fits through a slot on the bracket portion and has a hole for receiving a threaded structure;
c) an LED light fixture with a plurality of LED arrays; and
d) a suspension cable that is a power feed for powering the plurality of LED arrays with low-voltage direct current from an LED driver, wherein the suspension cable attaches to the hook plate and the LED light fixture and wherein turning the threaded structure moves the hook plate up or down thereby moving the LED light fixture up or down.

2. The lighting system of claim 1, wherein LED driver junction box housed one of more LED driver circuits are coupled to a load circuit through quick-lock or snap connectors.

3. The lighting system of claim 1, further comprising a back-up battery coupled to the power feed for providing power to the LED light fixture in the event of a power failure.

4. The lighting system of claim 2, further comprising a controller coupled to the one or more LED driver for controlling light emitted by the LED light fixture.

5. The lighting system of claim 1, wherein the LED arrays include 20 or more light emitting diodes.

6. The lighting system of claim 5, wherein the 20 or more light emitting diodes each use 0.2 watts or less of electrical power.

7. A lighting system comprising:
   a) LED driver junction box with junction box portion with a receptacle opening and an driver box portion that is volume communication with the junction box portion;
   b) gantry leveling mechanisms, each with a bracket portion that attaches to and is positioned within the junction box portion of the LED driver junction box and a hook plate with a tab structure that fits through a slot on the bracket portion and has a hole for receiving a threaded structure;
   c) an LED light fixture with a plurality of LED arrays; and
   d) suspension cables that attach to each of the hook plate and the LED light fixture, wherein at least on to the suspension cables provides a power feed for powering the plurality of LED arrays with low-voltage direct current from one or more modular LED driver circuits and wherein turning the threaded structure moves the hook plate up or down and thereby moving the LED light fixture up or down.

8. The lighting system of claim 7, wherein the driver box portion of the LED driver junction box is elongated and angled with respect to a receptacle opening such that one more modular LED driver circuits are replaceable from the driver box portion and through the receptacle opening of the junction box portion.

9. The lighting system of claim 7, wherein one or more modular LED driver circuits are coupled to a load circuit through quick-lock or snap connectors.

10. The lighting system of claim 7, further comprising a back-up battery coupled to the power feed for providing power to the LED light fixture in the event of a power failure.

11. The lighting system of claim 7, further comprising a controller coupled to the one or more modular LED driver circuits for controlling light emitted by the LED light fixture.

12. The lighting system of claim 7, wherein the LED arrays include 20 or more light emitting diodes.

13. The lighting system of claim 12, wherein the 20 or more light emitting diodes each use 0.2 watts or less of electrical power.

14. A lighting system comprising:
   a) a low-profile LED driver box with junction box portion with a receptacle opening and an driver box portion that is volume communication with the junction box portion;
   b) an LED light fixture with a plurality of LED arrays;
   c) a suspension mechanism comprising:
      I) gantry leveling mechanisms each with a bracket portion that attaches to and positioned within the junction box portion of the LED driver junction box and a hook plate with a tab structure that fits through a slot on the bracket portion and has a hole for receiving a threaded structure; and
      ii) suspension cables that detachable couple to the LED light fixture, wherein at least one of the suspension cables provides a power feed for powering the plurality of LED arrays with low-voltage direct current from one or more modular LED driver circuits and wherein turning the threaded structure moves the hook plate up or down and thereby moves portions of the attached LED light fixture up or down; and
   d) a controller for proving independent dimming control of the upward lighting and downward lighting emitted from the linear arrays of LEDs.

15. The lighting system of claim 14, wherein arrays of LEDs include 20 or more light emitting diodes.

16. The lighting system of claim 15, wherein the 20 or more light emitting diodes each use 0.2 watts or less of electrical power.

17. The lighting system of claim 14, wherein suspension mechanism comprises two to four suspension cables and two to four corresponding gantry leveling mechanisms.

18. The lighting system of claim 14, further comprising a plate that couples to the receptacle opening of the junction box portion of the low-profile LED driver box.

19. The lighting system of claim 14, wherein the driver box portion of the LED driver junction box is elongated and angled with respect to a receptacle opening such that one more modular LED driver circuits are replaceable from the driver box portion and through the receptacle opening of the junction box portion.

* * * * *